(12) United States Patent
Brose et al.

(10) Patent No.: US 8,857,732 B2
(45) Date of Patent: Oct. 14, 2014

(54) SPRAY GUN WITH PRESSURE MEASURING DEVICE

(75) Inventors: Jens Brose, Ottmarsheim (DE);
Alexander Tschan, Kornwestheim (DE)

(73) Assignee: Sata GmbH & Co KG, Kornwestheim (DE)

( * ) Notice: Subject to any disclaimer, the term of this patent is extended or adjusted under 35 U.S.C. 154(b) by 463 days.

(21) Appl. No.: 13/259,189

(22) PCT Filed: Apr. 20, 2010

(86) PCT No.: PCT/EP2010/002392
§ 371 (c)(1),
(2), (4) Date: Sep. 23, 2011

(87) PCT Pub. No.: WO2010/127766
PCT Pub. Date: Nov. 11, 2010

(65) Prior Publication Data
US 2012/0012671 A1    Jan. 19, 2012

(30) Foreign Application Priority Data

May 7, 2009   (DE) .......................... 10 2009 020 194

(51) Int. Cl.
*B67D 7/08* (2010.01)
*B67D 7/56* (2010.01)
(Continued)

(52) U.S. Cl.
CPC .................. *B05B 12/008* (2013.01); *B05B 7/12* (2013.01); *G01L 19/0007* (2013.01)
USPC ................. 239/74; 239/71; 239/600; 73/756; 116/266

(58) Field of Classification Search
CPC .. B05B 12/004; B05B 12/006; B05B 12/008; G01L 19/0007; G01L 19/003; G01L 19/147; G01L 19/16

USPC ..................... 239/71, 74, 310, 525, 526, 600, 239/DIG. 14; 73/714, 753, 756; 116/264, 116/265, 266
See application file for complete search history.

(56) References Cited

U.S. PATENT DOCUMENTS 4,901,761 A * 2/1990 Taylor ........................... 137/557
5,191,797 A * 3/1993 Smith ............................. 73/714
(Continued)

FOREIGN PATENT DOCUMENTS

DE    3906219 A1   8/1990
DE    19807973 C1   7/1999
(Continued)

OTHER PUBLICATIONS

International Preliminary Report on Patentability and Written Opinion of the International Searching Authority mailed Nov. 17, 2011 for PCT/EP2010/002392 filed Apr. 20, 2010.
(Continued)

*Primary Examiner* — Ryan Reis
(74) *Attorney, Agent, or Firm* — Fleit Gibbons Gutman Bongini & Bianco PL; Martin Fleit; Paul D. Bianco

(57) ABSTRACT

The invention relates to a spray gun comprising a gun body (1), a nozzle arrangement (9) arranged on said gun body (1), a compressed air supply channel (22, 23) which is arranged in the gun body (1) and which comprises a valve arrangement (17) for controlling the compressed air supply to the nozzle arrangement (9), a device (31, 33, 37, 42, 40) for controlling the compressed air supply, and a pressure measuring device (35) for recording and displaying the pressure in the compressed air channel (22). Said invention is characterized in that said pressure measuring device (35) is secured in a removable manner to the device (31, 33, 37, 42, 40) for controlling the compressed air supply.

36 Claims, 7 Drawing Sheets

(51) Int. Cl.
*G01L 7/00* (2006.01)
*G01P 3/00* (2006.01)
*B05B 7/12* (2006.01)
*B05B 12/00* (2006.01)
*G01L 19/00* (2006.01)

(56) References Cited

U.S. PATENT DOCUMENTS

| | | | |
|---|---|---|---|
| 5,333,506 A * | 8/1994 | Smith et al. | 73/756 |
| 5,874,680 A * | 2/1999 | Moore | 73/756 |
| 6,010,082 A * | 1/2000 | Peterson | 239/346 |
| 6,845,924 B2 * | 1/2005 | Schmon | 239/526 |
| 7,216,813 B2 * | 5/2007 | Rogers | 239/74 |
| 7,249,519 B2 | 7/2007 | Rogers | |
| 7,384,004 B2 | 6/2008 | Rogers | |
| 7,765,876 B1 * | 8/2010 | Chen | 73/756 |
| 8,042,402 B2 * | 10/2011 | Brown et al. | 73/756 |
| 2003/0164408 A1 | 9/2003 | Schmon | |
| 2003/0230636 A1 | 12/2003 | Rogers | |
| 2005/0252993 A1 | 11/2005 | Rogers | |
| 2005/0252994 A1 | 11/2005 | Rogers | |
| 2009/0183516 A1 | 7/2009 | Appler et al. | |

FOREIGN PATENT DOCUMENTS

| | | |
|---|---|---|
| EP | 0567325 A2 | 10/1993 |
| EP | 1247586 A1 | 10/2002 |
| EP | 1294490 A1 | 3/2003 |
| GB | 2411235 A | 8/2005 |
| JP | H0530749 U | 4/1993 |
| JP | H05172678 A | 7/1993 |
| JP | H06215741 A | 8/1994 |
| JP | 2003042882 A | 2/2003 |
| JP | 2004017044 A | 1/2004 |
| WO | 9116610 A1 | 10/1991 |
| WO | 0200355 A1 | 1/2002 |
| WO | 2007128127 A1 | 11/2007 |

OTHER PUBLICATIONS

International Search Report published Mar. 10, 2011 for PCT/EP2010/002392 filed Apr. 20, 2010.

Japanese Office Action issued against JP Patent Application No. 2012-508926 on Feb. 25, 2014 and English translation.

* cited by examiner

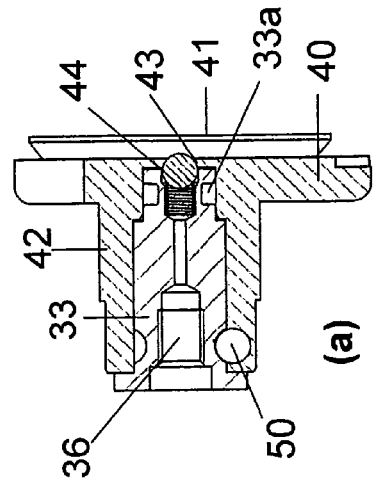
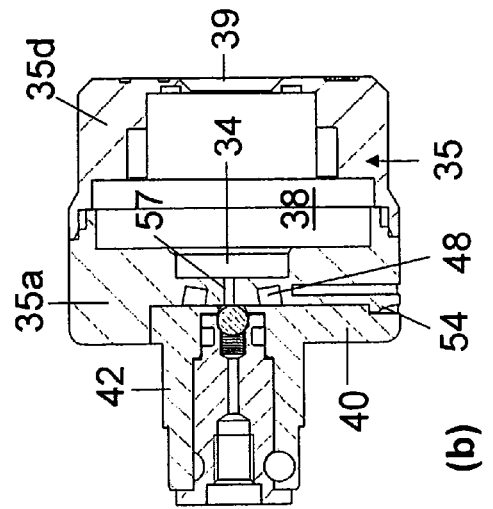
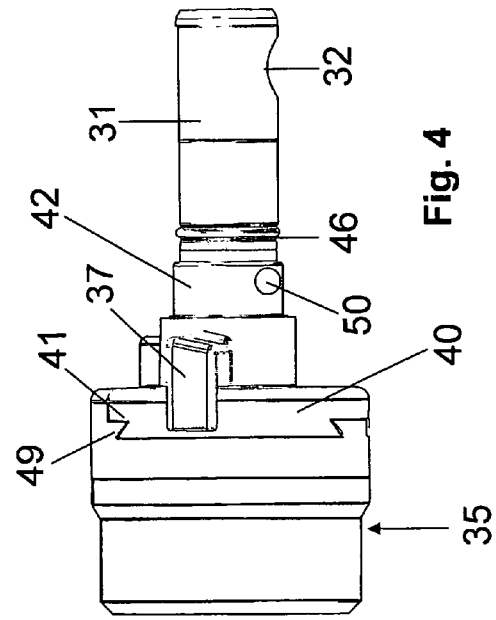
Fig. 4
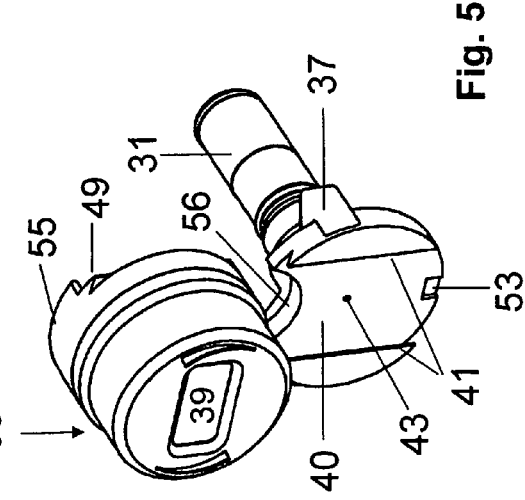
Fig. 5

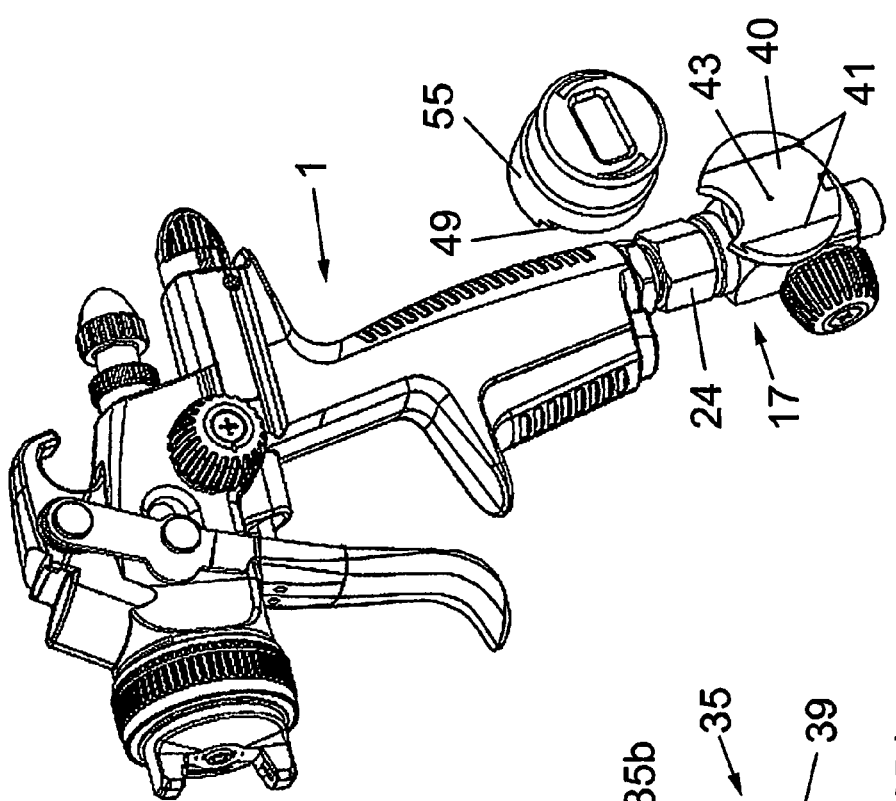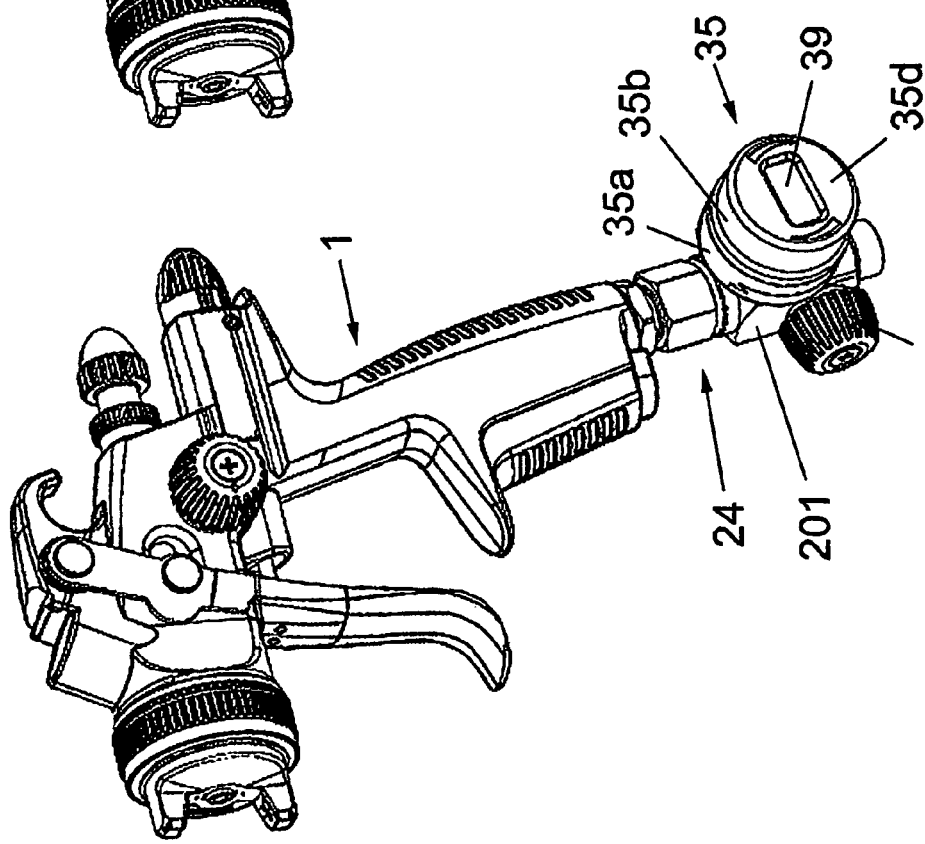

US 8,857,732 B2

SPRAY GUN WITH PRESSURE MEASURING DEVICE

FIELD OF THE INVENTION

The invention concerns a spray gun and a testing air cap for a spray gun.

BACKGROUND OF THE INVENTION

Such a spray gun is known from EP 1 294 490 B1. With this spray gun with a gun body, a nozzle arrangement on the gun body, a compressed air supply channel arranged in the gun body, with a valve arrangement for the control of the supply of the compressed air for the nozzle arrangement, and a device for regulation of the supply of compressed air, a pressure measuring device for the recording and display of the pressure in the compressed air supply channel is integrated into the device for regulation of the supply of compressed air. The pressure measuring device is thereby accommodated in a housing, wherein the housing is appropriately designed as a turning knob and in this way, the function of an adjustment element is exerted, with which the compressed air supplied to the nozzle arrangement can be regulated.

The disadvantage in this arrangement is that for regulation of the supply of compressed air, the pressure measuring device, which has a pressure display, is rotated, wherein the pressure display also assumes various settings, dependent on the setting of the rotating knob, and, under certain circumstances, is upside down in certain settings. In such unfavorable settings, the user can read the pressure display only with difficulty. With the known arrangement, a pressure measuring device, desired as a digital manometer, with a digital display is preferably used. A needed replacement of batteries proves to be cumbersome hereby, since to do this, the device for regulation of the supply of compressed air must first be dismantled from the spray gun and then the pressure measuring device integrated therein. Moreover, with the known arrangement, there is the danger of an unintended adjustment of the rotating knob, wherein, the supply of the compressed air is unintentionally changed. Furthermore, when cleaning the spray gun, the digital manometer can be brought into contact with the cleaning agent and can be soiled or damaged.

SUMMARY OF THE INVENTION

Proceeding from this, a goal of the invention is to further develop a generic spray gun so that it has a functioning pressure measuring device, which is, if possible, satisfactory at any time.

This goal is attained with a spray gun and with a device for incorporation into a compressed air-operated spray gun for regulation of the supply of compressed air, and of a pressure measuring device, as set forth herein. Preferred embodiments of the spray gun, in accordance with the invention as well as other advantageous details and developments of the invention are also set forth herein.

With the spray gun, in accordance with the invention, it is possible for the pressure measuring device not to be soiled or damaged during cleaning operations and for a battery replacement during the use of a digital manometer to be carried out simply. With the spray gun, in accordance with the invention, it is ensured that the pressure display of the pressure measuring device is stationary, independent of the setting of regulation of the supply of compressed air, and that it can be read well at any time and that an unintended adjustment of regulation of the supply of compressed air can be avoided.

BRIEF DESCRIPTION OF THE FIGURES

The invention is explained in more detail, below, with the aid of exemplified embodiments, with reference to the accompanying drawings. The drawings show the following:

FIG. 4: side view of a device, in accordance with the invention, for regulation of the supply of compressed air of a spray gun, in accordance with the invention, with a pressure measuring device affixed thereon;

FIG. 5: perspective view of the device for regulation of the supply of compressed air of FIG. 4, with a pressure measuring device removed therefrom;

FIG. 7: detailed view of the device for regulation of the supply of compressed air of FIG. 4, in cross-section (FIG. 7a) and detailed view of the device for regulation of the supply of compressed air in cross-section, with a pressure measuring device affixed thereon (FIG. 7b);

FIG. 10: perspective view of another spray gun, in accordance with the invention, with an inserted device for regulation of the supply of compressed air;

FIG. 11: the spray gun, in accordance with FIG. 10, with a pressure measuring device removed therefrom;

DETAILED DESCRIPTION OF THE INVENTION

Figure 1:
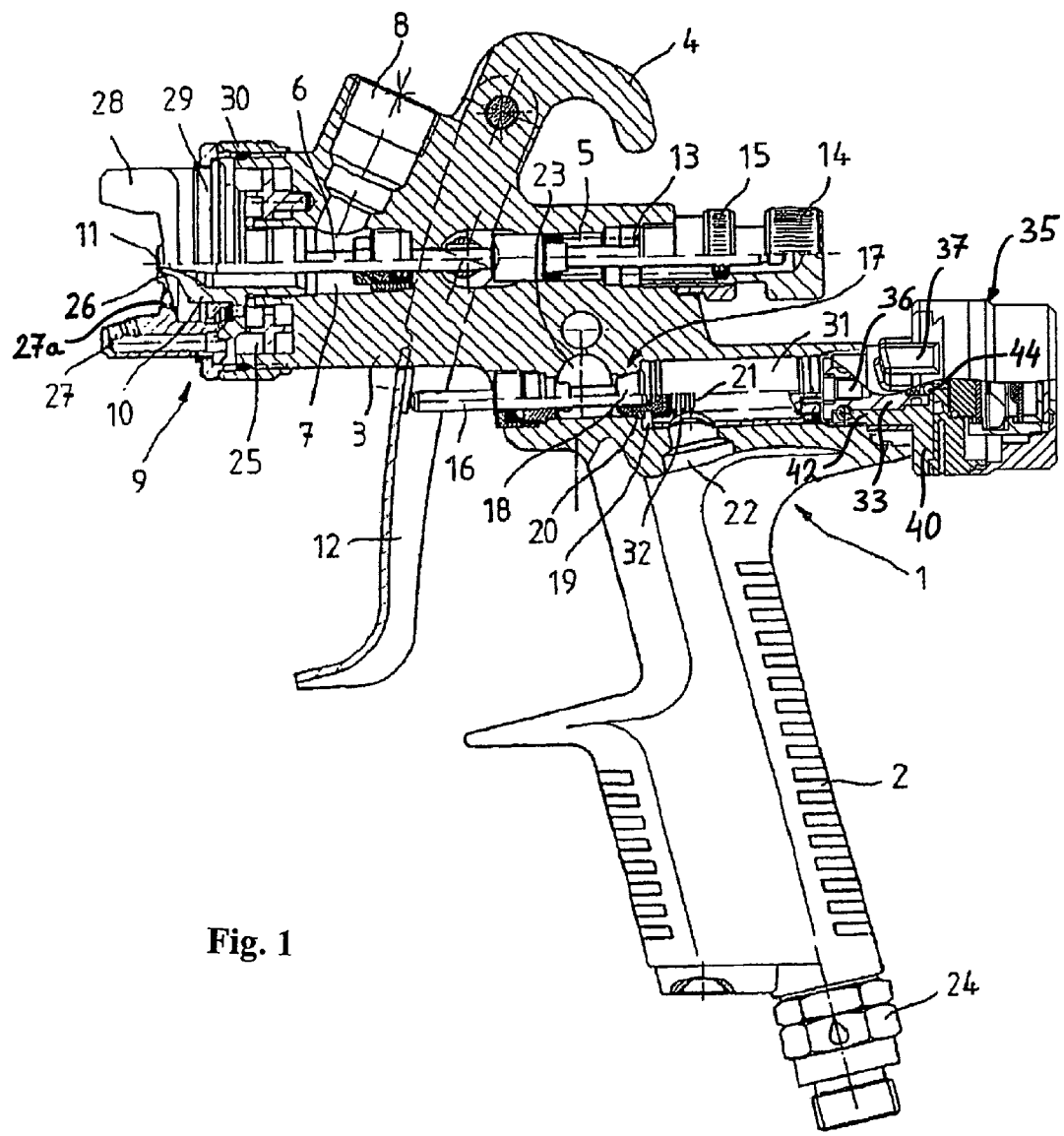
FIG. 1: a partially cut side view of a spray gun, in accordance with the invention, with an inserted device for regulation of the supply of compressed air and a pressure measuring device affixed thereon.
Figure 3:
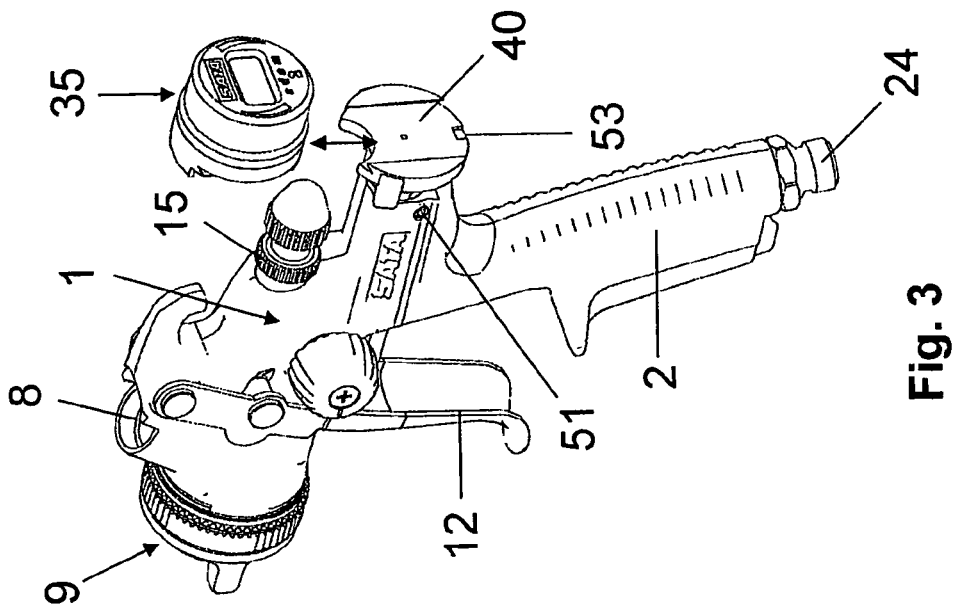
FIG. 3: perspective view of the spray gun of FIG. 2 with an inserted device for regulation of the supply of compressed air and a pressure measuring device removed therefrom.
Figure 2:
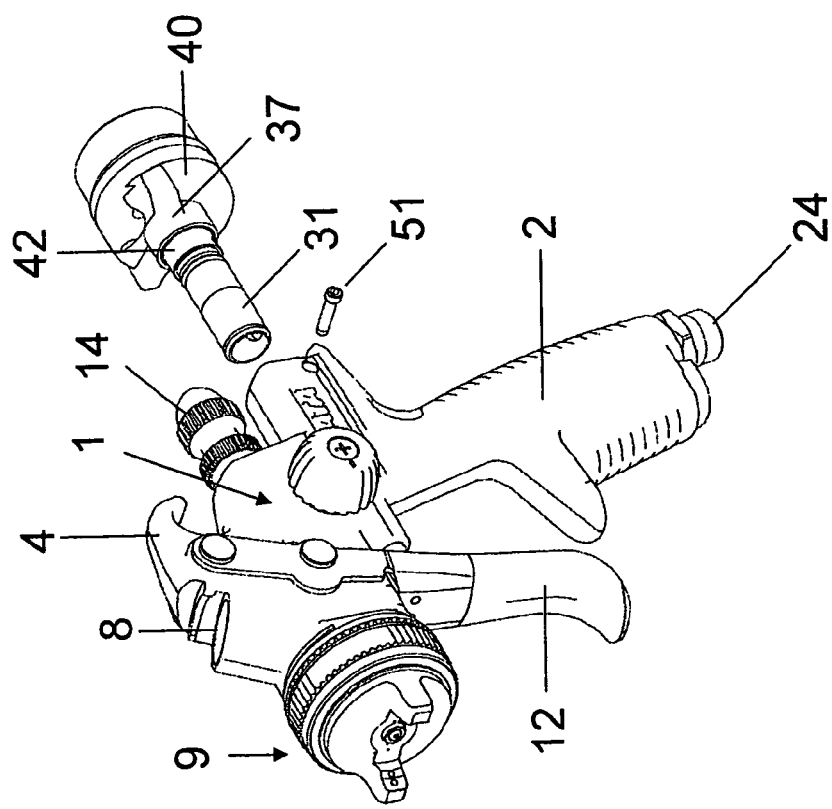
FIG. 2: a perspective view of a spray gun, in accordance with the invention, with a drawn-out device for regulation of the supply of compressed air and the pressure measuring device affixed thereon.

The spray gun shown in FIGS. 1-3 contains a gun body 1 with a grip 2 and an upper part 3, on which a suspension hook 4 is formed. A passage borehole 5, which is continuous from front to back and is multiply graduated and in which a nozzle needle 6 is conducted axially, so that it can be displaced, runs through the upper part 3. In a front area, the passage borehole 5 forms an expanded holder space 7, into which an inclined inflow borehole 8 opens for the mounting of a paint-holding container, which is not depicted. On the front end of the passage borehole 5, a nozzle arrangement 9 is mounted, which contains a fixable paint nozzle 10, by means of a thread, on the upper part 3 of the gun body 1. The paint nozzle 10 has a nozzle borehole 11, on its front end, which, together with a tapering front end part of the nozzle needle 6, which can move axially via an actuation lever 12, forms a regulatable inflow for the paint, varnish, or the like. The actuation lever 12 is connected with the nozzle needle 6 in such a way that it is pushed backwards against the force of a spring 13, when the actuation lever 12 is retracted, and opens the nozzle borehole 11 for the release of the paint. The pretension of the compressed spring 13 and the path of the nozzle needle can be adjusted, when the actuation lever is retracted, by means of an adjusting screw 14, with a corresponding counter nut 15, located on the back end of the passage borehole 5. By means of the actuation lever 12, furthermore, a valve arrangement 17 for the control of the supply of the compressed air to the nozzle arrangement 9 can be actuated via a bar 16.

The valve arrangement 17 contains a closing cone 18, connected with the rod 16, and a valve seat 20, provided in a borehole 19 in the gun body 1, against which the closing cone 18 is pressed by a spring 21. When the actuation lever 12 is retracted, the closing cone 18 is lifted above the rod 16 from the valve seat 20, against the force of the spring 21, wherein a connection is opened to the nozzle arrangement 9, between a lower part 22 of a compressed air supply channel for the supply of the compressed air, placed upstream from the valve arrangement 17 and an upper part 23, placed downstream from the valve arrangement 17. A compressed air connection 24 for a compressed air conduit, which is connected with the lower part 22 of the compressed air supply channel, is located on the underside of the grip 2.

From the upper part 23 of the compressed air supply channel, the compressed air is conducted to an air conducting system 25 and, from there, to an annular gap 26, which is formed by the nozzle borehole 11 and the front ends of the paint nozzle 10. In the area of the nozzle borehole 11, the compressed air produces a vacuum, through which the paint is suctioned from the paint nozzle borehole and is entrained with the compressed air, forming a round jet. Via so-called horn air boreholes 27 in the projecting horns 28 of an air cap 29, surrounding the paint nozzle 10, the compressed air can also exit for the formation of the round jet into a flat jet. The air cap 29 can be affixed, via a union nut 30, on the upper part 3 of the housing 1. Control boreholes 27a in the air nozzle are thereby used for the formation of the jet.

Furthermore, a device for regulation of the supply of compressed air is located in the borehole 19 in the gun body 1. This device contains a rotatable sleeve 31, which has a transverse borehole 32 in the area of the discharge of the lower part 22 of the compressed air supply channel into the borehole 19. The sleeve 31 is connected, in a stationary manner, with a rear holding part 33, which is arranged, so it can rotate, on the rear end of the borehole 19. By rotating the holding part 33, it is thus possible to rotate the sleeve 31 also and thus it is possible to regulate the air passage in the area of the transverse borehole 32.

The device for the regulation of the compressed air supply also comprises a housing connecting piece 42 and an affixing plate 40, formed on it as one piece. The holding part 33 is shoved into the hollow-cylindrical connecting piece 42, in a manner so it can be turned. The connecting piece 42 is affixed on the spray gun body 1, via an affixing screw 51 (FIGS. 2 and 3), which meshes into a borehole 50 on the connecting piece 42 (FIG. 4). The connecting piece 42 and the holding plate 40, formed thereon, can therefore not be turned, vis-a-vis the spray gun body 1. A pressure measuring device 35 is affixed on the affixing plate 40 in such a way that it can be removed.

Figure 6:
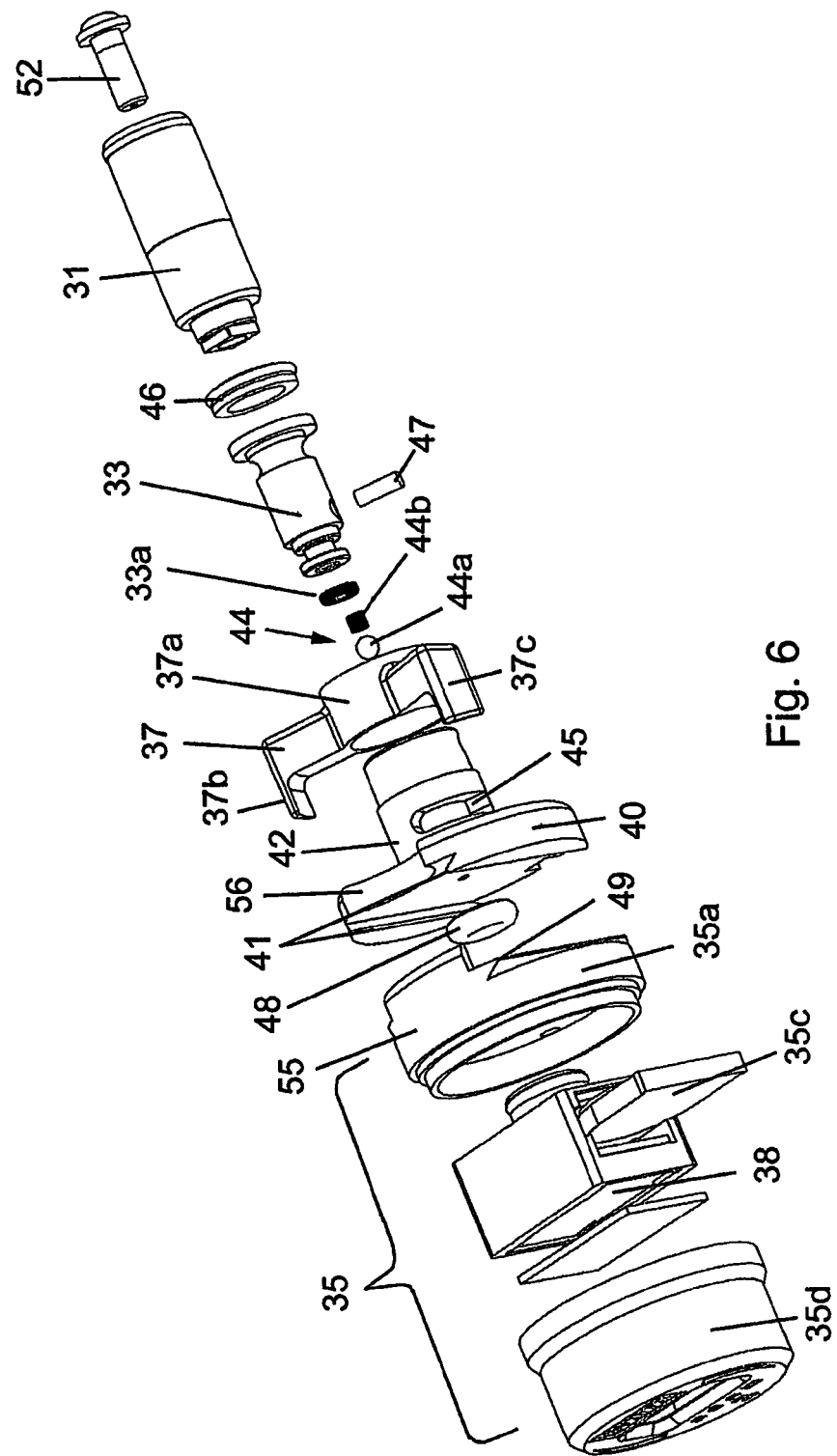
FIG. 6: blow-up representation of the device for regulation of the supply of compressed air of FIG. 4 with a pressure measuring device affixed thereon.

The device for regulation of the supply of compressed air, with the pressure measuring device 35, is shown, in FIG. 4, in a side view and, in FIG. 6, in a blowup representation, in detail. From the blowup representation of FIG. 6, one can see the structure of the device for regulation of the supply of compressed air and the pressure measuring device 35, affixed thereon, in detail. As shown in FIGS. 4 and 6, the device for regulation of the supply of compressed air comprises the hollow-cylindrical connecting piece 42, on which the affixing plate 40 is formed, as one piece. The connecting piece 42 and the affixing plate 40 are preferably made of metal. The affixing plate 40 and/or the connecting piece 42 can also be made of plastic, combinations of metal/plastic, or other suitable materials. A longitudinal hole 45 is introduced in the hollow cylindrical connecting piece 42, on the outer circumference of the connecting piece 42, which extends over an angular area of approximately 90° C. The angular area should be maintained more or else. With an angle of approximately 60°, namely, a sufficient rotational movement would not be possible at all; with an angle of approximately 180°, the rotational movement would be undesirably large. A central passage borehole 43 is introduced in the affixing plate 40. The front part of the holding part 33, depicted dark in FIG. 6, is shoved in the hollow-cylindrical connecting piece 42, so that it can turn. The holding part 33 is connected with the sleeve 31, in a stationary manner, via a form-locking connection, for example, a square (hexagonal) and fixed on the holder part 33 by means of an affixing screw 52 and is sealed off with a sealing element, designed here as a sealing ring 46. A sealing element could also be injected or affixed in some other manner. A regulating lever 37 is shoved over the outer circumference of the hollow-cylindrical connecting piece 42 and placed so that it cannot rotate, relative to the connecting piece 42. The regulating lever 37 has an annular base 37a with two vanes 37b, 37c, formed on it, as one piece, and is connected with the holding part 33 by means of a connecting bolt 47, which meshes through the longitudinal hole 45. The regulating lever 37 can be turned, relative to the connecting piece 42, in an angular area specified by the longitudinal hole 45. Upon rotating the regulating lever 37, the holding part 33, articulated on it, with the bolt 47, and the sleeve 31, connected with it in a stationary manner, turn. In this way, the compressed air supplied to the compressed air supply channel 23, from the compressed air channel 22, can be regulated upon rotating the regulating lever 37. The end areas of the two vanes 37b, 37c of the regulating lever overlap the outer circumference of the affixing plate 40 and on the outer circumference of the affixing plate, markings on which the position of the regulating lever can be read off are preferably placed.

To record the pressure of the compressed air supplied to the compressed air supply channel 23, the compressed air measuring device 35 is provided, which is affixed, in a removable manner, on the device to regulate the supply of the compressed air. The structure of the pressure measuring device 35 and the mode of fastening on the device for regulation of the supply of compressed are likewise visible from the blowup representation of FIG. 6. The pressure measuring device 35 comprises a housing lower part 35a, a pressure measuring unit 35b with a pressure recorder 38, and a housing lid 35d. In the embodiment shown in the drawings, the pressure measuring device 35 is designed as a digital manometer with an electronic digital display 39. Instead of a digital manometer, however, a manometer with an analog pressure display (pointer indicator) can also be used. In the digital manometer represented here graphically, a removable battery 35c is provided for the energy supply. In order to be able to replace the battery 35c, the housing lid 35d can be removed from the housing lower part 35a.

Figure 8:
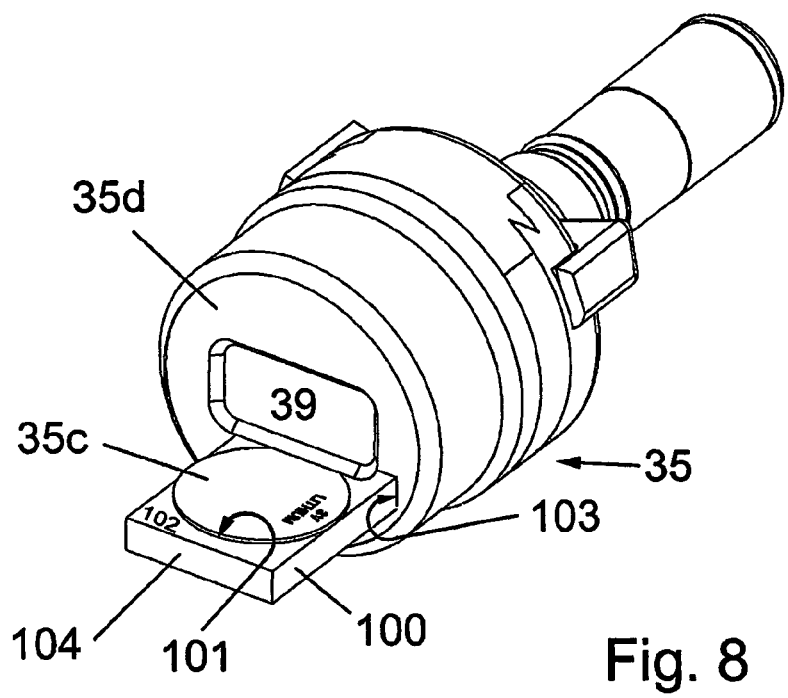
FIG. 8: perspective view of a digital pressure measuring device.
Figure 9:
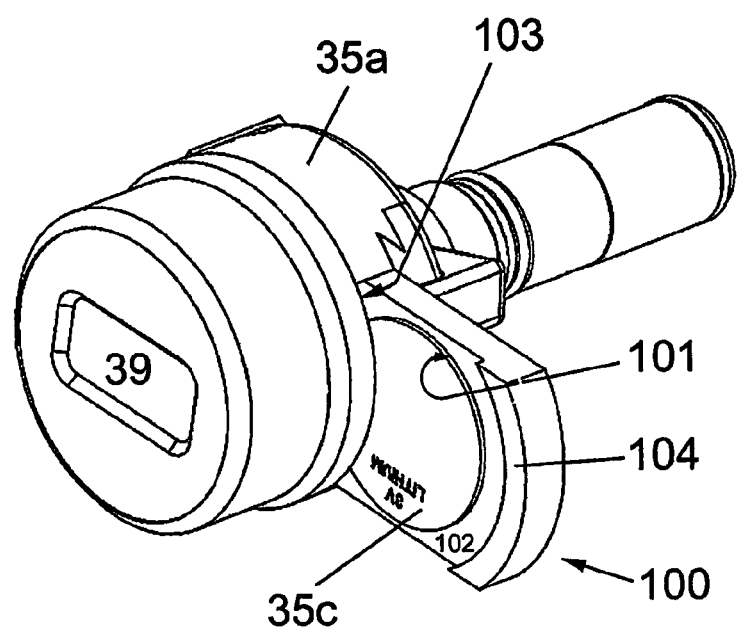
FIG. 9: perspective view of another digital pressure measuring device.

In the two other development forms shown graphically in FIGS. 8 and 9, a compartment 100 is located in the housing part 35, in which the battery 35c is kept and accordingly can be pushed in and out without any problem and therefore can be replaced, without the digital manometer having to be taken apart. Appropriately, the compartment 100 is essentially shaped in the form of a block and has a positioned cylindrical blind hole 101, whose size is coordinated with the size of the battery 35*c*, designed here as a round cell battery, in such a way that its surface closes planarly with the surface 102 of the compartment 100. The compartment 100 is placed in an opening 103 provided in the housing 35 so that it can be moved and is sealed hermetically tight, relative to the housing 35, by means of (nondepicted) sealing elements. If the compartment is made of plastic, the sealing effect can preferably be produced by sealing lips formed on the plastic compartment. However, it can also be brought about by O-rings or the like. In the embodiment according to FIG. 8, the compartment 100 is thereby located right below the digital display 39 in the housing lid 35*d* and thus, in the front, on the pressure measuring device 35, whereas with the embodiment according to FIG. 9, it is provided in a lateral area of the housing lower part 35*a*. Since this housing lower part 35*a* is rounded off, the front area 104 of the compartment is also rounded off here. In both embodiments, the length of the compartment 100 is selected in such a way that the front area 104 of the compartment 100 projects slightly over the surface of the housing lid 35*d* or the housing lower part 35*a*, so that the compartment 100 can be gripped well for the battery replacement. However, it would also be possible to provide a hook-like or knob-like projection on the front area 104 of the compartment 100 as a handle. Other developments of the compartment 100, for example, in the frame or the like, are conceivable.

In another embodiment, which is not depicted, the compartment 100 is supported on its rear area, opposite the front area 104, by one or more springs on the housing 35. Positionings for the compartment 100, for example, latching elements, are provided on the compartment 100 and/or on the housing opening 103. In this way, an automatic opening and perhaps, closing of the compartment 100 can be implementing after exerting slight manual pressure on the front area 104 of the compartment 100.

Affixing elements 49 are provided on the rear side of the housing lower part 35*a*. These affixing elements 49 are designed in such a way that they work together with complementary affixing elements 41 on the affixing plate 40, if the pressure measuring device 35 is affixed on the device for regulation of the supply of compressed air. In the embodiment example shown here graphically, the affixing elements 49 and 41 are complementary elements of a dovetail joint. To affix the pressure measuring device 35 on the device for regulation of the supply of compressed air, the affixing elements 49, located on the rear side of the housing lower part 35*a*, are shoved into the complementary affixing element 41 of the dovetail joint, as they are alluded to, in FIG. 3, with the double arrow. In order to prevent an unintended loosening of the dovetail joint, a latching connection is also provided, which is implemented by a latching groove 53 in the affixing plate 40 and a latching lug 54, complementary to it, on the rear side of the housing lower part 35*a* (FIGS. 4, 5, and 7). In order to guarantee a correct positioning of the pressure measuring device 35 on the affixing plate 40, a projection 55 is also provided on the rear side of the housing lower part 35*a*; it works together with a complementarily shaped recess 56 of the affixing plate 40 (FIG. 5). The recess 56 makes possible, with a removed pressure measuring device, the complete unscrewing of the adjusting screw 14 and the dismantling of the nozzle needle 6, without dismantling the affixing plate 40. Furthermore, it makes possible a particularly simple positioning of the display. The detachment, in accordance with the invention, is therefore very effective and, nevertheless, can be simply managed.

The pressure measuring device 35 could, however, be affixed by means of a clamping, screwing, bayonet-type, or latching connecting, by means of a magnetic connection, in another way, on the device 31, 33, 37, 42, 40 for regulation of the supply of compressed air.

In other nondepicted embodiments, the pressure measuring device 35 could be affixed, in a nondetachable manner, by the device 31, 33, 37, 42, 40 for regulation of the supply of compressed air. Such embodiments can, for example, be produced by the cementing or welding of the pressure measuring device 35 on the device 31, 33, 37, 42, 40.

In another embodiment which is also not depicted, the affixing plate 40 and the housing 35*a* are made as one piece.

An air channel 36, 43, which produces a connection from the compressed air supply channel to the pressure measuring device 35, is provided in the device for regulation of the supply of compressed air for the transfer of the pressure of the compressed air from the compressed air supply channel 23 to the pressure measuring device 35. The air channel comprises a capillary 36, running in the holding part 33, in its longitudinal direction, which discharges into the passage borehole 43 in the affixing plate 40. The holding part 33 is sealed off by means of an O-ring 33*a*, with respect to the hollow-cylindrical connection 42. An air entry opening 57 is provided on the rear side of the housing lower part 35*a* of the pressure measuring device 35 (FIG. 7). If the pressure measuring device is affixed on the device for regulation of the supply of compressed air, the air entry opening 57 is connected with the compressed air supply channel 22, 23 via the passage borehole 43 and the capillary 36, and the pressure of the compressed air supply channel occurs on the pressure measuring device 35.

The pressure-transferring connection between the pressure measuring device 35 and the device for regulation of the supply of compressed air is shown, in detail, in the section drawings of FIGS. 7*a* and 7*b*. In FIG. 7*a*, the rear area of the device for regulation of the supply of compressed air with the connecting piece 42 and the affixing plate 40, located thereon, and the capillary 36, running through the holding part 33, is shown. FIG. 7*a* shows the device for regulation of the supply of compressed air with a removed pressure measuring device. In this state, the passage borehole 43 in the affixing plate 40 is closed by a valve 44. By means of the valve 44, with the removed pressure measuring device 35, the cleaning agent or varnish can be reliably prevented from penetrating, in an uncontrolled manner, into the capillary 36 and clogging it. Also, the exiting of compressed air and the penetration of liquid is prevented by the valve 44.

With the embodiment example shown here graphically, the valve 44 is formed by a ball valve with a closure ball 44*a* and a spring 44*b* (FIG. 6), wherein the spring 44*b* presses the closure ball 44*a* into the passage borehole 43, if the pressure measuring device 35 is not affixed on the affixing plate 40. In this position, a part of the closure ball 44*a* protrudes over the surface of the affixing plate 40, as shown in FIG. 7*a*. If the pressure measuring device 35 on the affixing plate 40 is affixed, the rear side of the housing lower part 35*a* of the pressure measuring device 35 pushes the closure ball 44*a* against the force of the spring 44*b* from the passage borehole 43 back in the direction of the capillary 36. In this way, the air channel 36, 43 is automatically opened. To produce the connection between the air channel 36, 43 and the air entry opening 57 on the pressure measuring device 35, the air entry opening 57 is slightly moved, radially, toward the capillary 36. By means of the radial movement, the air entry opening 57 on the pressure measuring device 35 is not closed by the closure ball 44*a* and the pressure prevailing in the compressed air supply channel 23 occurs on the pressure measuring device 35. This effect could also be attained by a different valve, for example, a cone valve or a plate valve. A pressure recording space 34 is provided in the pressure measuring device 35; it is connected with the air entry opening 57. Also, a pressure recorder 38, for example, in the form of a piezo-resistant pressure recorder, is located in the pressure measuring device 35; by means of it, the occurring pressure is recorded in the pressure recording space 34 and is indicated by a digital or analog display device 39. In order to guarantee a close connection between the air entry opening 57 on the pressure measuring device 35 and the passage borehole 43 in the affixing plate 40, a sealing element 48, in the form of an O-ring or an injecting plastic sealing element around the air entry opening 57, is located on the reverse of the housing lower part 35a. This sealing element 48 is pressed by the dovetail joint of the affixing elements 41, 49 between the reverse of the housing lower part 35a and the front side of the affixing plate 40, so that the pressure in the transition range between the passage borehole 43 in the affixing plate 40 and the air entry opening 57 cannot escape.

With the spray gun shown in FIGS. 10 and 11, the valve arrangement 17 is provided for the control of the supply of the compressed air in the area of the connection 24 for the (non-depicted) pressure air conduit on the gun body 1. For example, a compressed air hose can be connected to the hollow-cylindrical connecting piece 200. The valve arrangement 17 has, as usual, a valve body 201 with a regulating knob 202. A pressure measuring device 35, which, as the pressure measuring device 35, shown in FIGS. 4-7, is equipped with a digital display 39, a housing lower part 35a, a pressure measuring unit 35b, a battery (not depicted), and a housing lid 35d), is placed, in a removable manner, on the valve body 201 of the valve arrangement 17. For this purpose, a hole, which serves as the measurement opening, is provided in the valve body 201. An affixing plate 40, which is designed like the affixing plate 40, shown in the previous embodiment examples, for example, in FIG. 4, and accordingly has a connecting piece with a central passage borehole 43, is affixed, in a rotating-proof manner, with this passable borehole 43, aligned with the hole in the valve body 201. It can be, for example, screwed on, cemented on, or welded on. A valve assembly with the same or similar details as shown in FIG. 6 (ball valve 44, and so forth), is likewise provided; the pressure measurement can, accordingly, take place in the manner described previously. The pressure measuring device 35 is pressed on the affixing plate 40, with the aid of the dovetail joint of the affixing elements 41, 49, between the reverse of the housing lower case 35a and the front side of the affixing plate 40.

The invention is not limited to the concretely described and depicted embodiments; other advantageous developments are readily conceivable.

In comparison to the arrangement known from the state of the art, the preferred embodiments of the spray gun, in accordance with the invention, are characterized in that the pressure measuring device 35 is affixed, in a removable manner, on the device for regulation of the supply of compressed air. The device for regulation of the supply of compressed air thereby appropriately comprises an affixing plate 40, which is firmly joined, via a connected piece 42, located thereon, and securely connected with the gun body, against turning. A manually actuatable regulating lever is provided on the device for regulation of the supply of compressed air, by means of which the compressed air, supplied to the compressed air supply channel, can be adjusted, without having to turn, for the purpose, the pressure measuring device, relative to the gun body. The pressure display 39 of the pressure measuring device can be read off well, for this reason, with each setting of regulation of the supply of compressed air. The pressure measuring device can be easily affixed, in a removable manner, on the device for regulation of the supply of compressed air, by means of affixing elements 41, 49. This makes possible a simple and rapid, manual removal of the pressure measuring device, without the aid of a tool, if it, for example, is a disturbance during varnishing operations in sites which are difficult to access. Due to the simple removal of the pressure measuring device 35, it is also possible to use the pressure measuring device for several different spray guns, without a complicated dismantling or installing being required in the gun bodies, from other spray guns. Moreover, due to the simple removal possibility of the pressure measuring device from the device for regulation of the supply of compressed air, a simple battery replacement is also made possible with digital pressure measuring devices.

For cleaning operations on the spray gun also, the pressure measuring device can be removed simply, so that it is not soiled or damaged. This is particularly advantageous when using automatic pistol cleaning devices.

The pressure measuring device 35 with the advantages described above can be used when using a bottom plate which is provided in the area 42 with a thread, etc., instead of a commercial nanometer, for example, with a cleaning or multiple use, etc.

Another advantage of the invention is that the spray gun can also be operated with a removed pressure measuring device 35.

Figure 12:
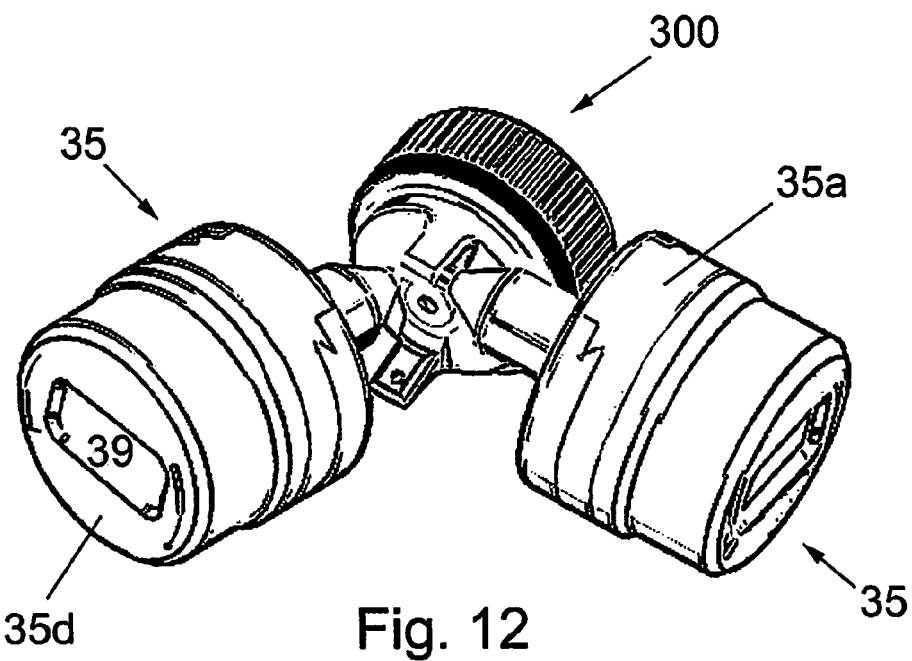
FIG. 12: perspective view of a testing air cap with pressure measuring device, in accordance with the invention.
Figure 13:
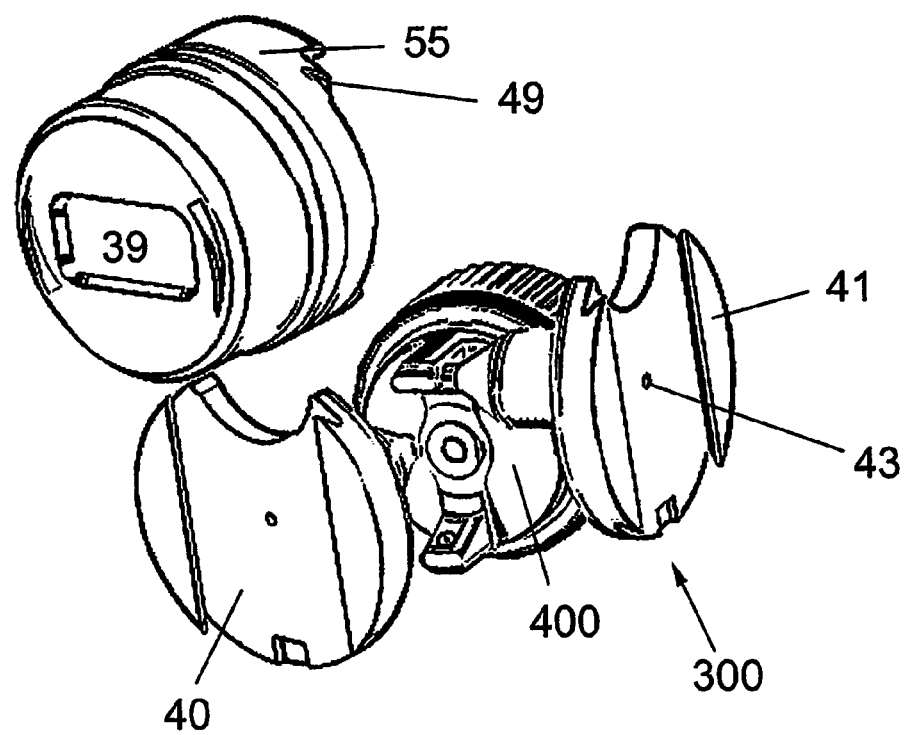
FIG. 13, the testing air cap, in accordance with FIG. 12, with a pressure measuring device removed therefrom.

FIGS. 12 and 13 show how the pressure measuring devices 35, in accordance with the invention, can be used, in other ways, on a spray gun. A testing air cap 300 of a commercial model, which is used to test center and horn air, is equipped with pressure measuring devices 35. Two affixing plates 40 are affixed here, via affixing cones 400, so they cannot rotate, for example, by screwing in, tightly, in the testing air cap 300. A valve assembly with details which are the same or similar, as shown in FIG. 6 (ball valve 44, etc.), is also provided; the pressure measurement can accordingly also be carried out here as previously described. The affixing plates 40 also have a central passage borehole 43 here. The pressure measuring devices 35 also have a digital display 39, a housing lower part 35a, a pressure measuring unit 35b, a battery (not depicted), and a housing lid 35d and are affixed, in a detachable manner, with the aid of the dovetail joint of the affixing elements 41, 49, between the reverse side of the housing lower part 35a and the front side of the affixing plate 40.

The pressure measuring device 35, in accordance with the invention, however, can also be used in ways other than with spray guns—for example, with a filter unit in the varnishing cabinet area, instead of a usual manometer, or for the pressure measurement of tires of motor vehicles or bicycles. Possibilities of use as replacement of common pressure measuring units in other industrial areas (boiler systems) and nonindustrial areas are likewise conceivable.

The invention claimed is:
1. A spray gun comprising:
a gun body,
a nozzle arrangement located on the gun body,
a compressed air supply channel located in the gun body coupled to the nozzle arrangement,
a valve arrangement to control supply of compressed air to the nozzle arrangement,
a regulating device located in the gun body upstream of the valve arrangement for regulation of the supply of compressed air, a pressure measuring device for the sensing and displaying of the pressure in the compressed air supply channel, and a mounting member having an exterior surface fixed to the gun body juxtaposed to the regulating device, the mounting member including a first air channel in communication with the regulated compressed air supply channel and leading to a portion of the exterior surface of the mounting member, and a normally closed valve mounted in the first air channel at the portion of the exterior surface of the mounting member, the pressure measuring device including a mating surface and a second air channel leading from the mating surface of the pressure measuring device to a pressure sensing element, the first and second air channels being axially off-line, and the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being open and the first and second air channels being placed in communication, and to enable manual demounting of the pressure measuring device from the mounting member with the normally closed valve being closed, whereby manual demounting of the pressure measuring device does not affect normal operation of the spray gun.

2. The spray gun according to claim 1, wherein the portion of the exterior surface of the mounting member and the mating surface of the pressure measuring device are of complementary geometrical shape.

3. The spray gun according to claim 1, wherein the normally closed valve includes a valve element that protrudes outwardly from the portion of the exterior surface of the mounting member.

4. The spray gun according to claim 1, wherein the mounting member is mechanically coupled with the regulating device and a control element is mounted on the mounting member for relative movement thereto that is coupled to the regulating device to enable manual manipulation of the control element to control regulation of the supply of compressed air.

5. The spray gun according to claim 4, wherein the control element is rotary through an arc of about 90 degrees relative to the mounting member.

6. The spray gun according to claim 5, wherein a sealing element is interposed between the mounting member and the regulating device adjacent the normally closed valve.

7. The spray gun according to claim 1, wherein a sealing member is mounted on the mating surface that surrounds and seals the first and second air channels when placed in communication.

8. The spray gun according to claim 1, wherein said first air channel in said mounting member is in communication with the regulated air supply channel via a capillary.

9. The spray gun according to claim 1, wherein said mounting member includes a tubular part projecting rearward from opposite the portion of the exterior surface that is fixed to the spray gun body.

10. The spray gun according to claim 1, wherein the portion of the exterior surface of the mounting member and the mating surface of the pressure measuring device having mutually engageable parts for latching the pressure measuring device on the mounting member when manually mounted.

11. A spray gun comprising:
a gun body,
a nozzle arrangement located on the gun body,
a compressed air supply channel located in the gun body coupled to the nozzle arrangement,
a valve arrangement to control supply of compressed air to the nozzle arrangement,
a regulating device located in the gun body upstream of the valve arrangement for regulation of the supply of compressed air,
a pressure measuring device for the sensing and displaying of the pressure in the compressed air supply channel, and
a mounting member having an exterior surface fixed to the gun body juxtaposed to the regulating device,
the mounting member including a first air channel in communication with the regulated compressed air supply channel and leading to a portion of the exterior surface of the mounting member, and a normally closed valve mounted in the first air channel at the portion of the exterior surface of the mounting member,
the pressure measuring device including a mating surface and a second air channel leading from the mating surface of the pressure measuring device to a pressure sensing element, and
the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being open and the first and second air channels being placed in communication, and to enable manual demounting of the pressure measuring device from the mounting member with the normally closed valve being closed, whereby manual demounting of the pressure measuring device does not affect normal operation of the spray gun, the mutually coacting elements of the mounting member and the pressure measuring device constituting a dovetail joint.

12. The spray gun according to claim 1, wherein the pressure measuring device comprises a housing composed of a housing inner part that includes said mating surface and a compartment is located in said housing for holding a battery.

13. The spray gun according to claim 12, wherein the compartment has a blind recess in which a battery can be held.

14. A spray gun comprising:
a gun body,
a nozzle arrangement located on the gun body,
a compressed air supply channel located in the gun body coupled to the nozzle arrangement,
a valve arrangement to control supply of compressed air to the nozzle arrangement,
a regulating device located in the gun body upstream of the valve arrangement for regulation of the supply of compressed air,
a pressure measuring device for the sensing and displaying of the pressure in the compressed air supply channel, and
a mounting member having an exterior surface fixed to the gun body juxtaposed to the regulating device,
the mounting member including a first air channel in communication with the regulated compressed air supply channel and leading to a portion of the exterior surface of the mounting member, and a normally closed valve mounted in the first air channel at the portion of the exterior surface of the mounting member, the pressure measuring device including a mating surface and a second air channel leading from the mating surface of the pressure measuring device to a pressure sensing element, and the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being open and the first and second air channels being placed in communication, and to enable manual demounting of the pressure measuring device from the mounting member with the normally closed valve being closed, whereby manual demounting of the pressure measuring device does not affect normal operation of the spray gun, the pressure measuring device including a housing composed of a housing inner part that includes said mating surface and a compartment being located in said housing for holding a battery, the compartment being slidably supported in the housing and a positioning element being provided for sliding said compartment out to expose a recess in which a battery can be positioned.

15. The spray gun according to claim 12, wherein the housing of the pressure measuring device includes a housing outer part, which is removably mounted on the housing inner part.

16. The spray gun according to claim 15, wherein a removable pressure measuring unit is contained in the removable housing outer part.

17. The spray gun according to claim 1, wherein a removable nozzle needle is included in the spray gun body, and the mounting member is configured to enable removal of the nozzle needle.

18. The spray gun according to claim 1, wherein the normally closed valve is comprised of a spring biased normally closed ball valve located at the portion of the exterior surface with the ball protruding slightly out of the exterior surface.

19. A testing air cap for a spray gun for testing center air pressure and horn air pressure in a center air channel and a horn air channel, respectively, of the spray gun, comprising
   a pair of mounting members;
   one mounting member having an exterior surface fixed to the testing air cap with a first air channel in said one mounting member having one end in communication with the air pressure in the center air channel and the other end terminating at a portion of the exterior surface of the one mounting member, a first normally closed valve mounted in the first air channel at the portion of the exterior surface of the one mounting member;
   the other mounting member having an exterior surface fixed to the testing air cap with a second air channel in said other mounting member having one end in communication with the air pressure in the horn air channel and the other end terminating at a portion of the exterior surface of the other mounting member, a second normally closed valve mounted in the second air channel at the portion of the exterior surface of the other mounting member;
   a pressure measuring device including a mating surface and a third air channel leading from the mating surface of the pressure measuring device to a pressure sensor, and
   the mounting members and the pressure measuring device having mutually coacting elements to enable manual mounting of a pressure measuring device onto at least one of the mounting members with the portion of the exterior surface of the mounting member and the mating surface of the pressure measuring device in engagement, the normally closed valve of the mounting member being open and the air channel of the mounting member and the third air channel being placed in communication, and to enable manual demounting of a pressure measuring device from a mounting member that closes the normally closed valve when the pressure measuring device is removed from the mounting member, whereby manual demounting of a pressure measuring device does not affect normal operation of the testing air cap.

20. An apparatus comprising:
   a working part that utilizes compressed air,
   a compressed air supply channel coupled to the working part to supply compressed air thereto,
   a valve to control the supply of compressed air to the working part,
   a regulating device located upstream of the valve for regulation of the supply of compressed air,
   a pressure measuring device for the sensing and displaying of the pressure in the compressed air supply channel downstream of said regulating device, and
   a mounting member having an exterior surface fixed to the apparatus juxtaposed to the regulating device,
   the mounting member including a first air channel in communication with the air supply channel downstream of the device for regulation of the supply of compressed air and leading to a portion of the exterior surface of the mounting member, and a normally closed valve mounted in the first air channel at the portion of the exterior surface of the mounting member,
   the pressure measuring device including a mating surface and a second air channel leading from the mating surface of the pressure measuring device to a pressure sensing element, the first and second air channels being axially off-line, and
   the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being open and the first and second air channels being placed in communication, and to enable manual demounting of the pressure measuring device from the mounting member to close the normally closed valve when the pressure measuring device is removed from the mounting member, whereby manual demounting of the pressure measuring device does not affect normal operation of the apparatus.

21. The apparatus according to claim 20, wherein the portion of the exterior surface of the mounting member and the mating surface of the pressure measuring device are of complementary geometrical shape.

22. The apparatus according to claim 20, wherein the normally closed valve includes a valve element that protrudes outwardly from the portion of the exterior surface of the mounting member.

23. The apparatus according to claim 20, wherein the mounting member is mechanically coupled with the regulating device and a control element is mounted on the mounting member for relative movement thereto that is coupled to the regulating device to enable manual manipulation of the control element to control regulation of the supply of compressed air.

24. The apparatus according to claim 23, wherein the control element is rotary through an arc of about 90 degrees relative to the mounting member.

25. The apparatus according to claim 24, wherein a sealing element is interposed between the mounting member and the regulating device adjacent the normally closed valve.

26. The apparatus according to claim 20, wherein a sealing member is mounted on the mating surface that surrounds and seals the first and second air channels when placed in communication.

27. The apparatus according to claim 20, wherein said first air channel in said mounting member are in communication with the regulated air supply channel via a capillary.

28. The apparatus according to claim 20, wherein said mounting member includes a tubular part projecting rearward from opposite the portion of the exterior surface that is fixed to the apparatus.

29. The apparatus according to claim 20, wherein the portion of the exterior surface of the mounting member and the mating surface of the pressure measuring device have mutually engageable parts for latching the pressure measuring device on the mounting member when manually mounted.

30. An apparatus comprising:
a working part that utilizes compressed air,
a compressed air supply channel coupled to the working part to supply compressed air thereto,
a valve to control the supply of compressed air to the working part,
a regulating device located upstream of the valve for regulation of the supply of compressed air,
a pressure measuring device for the sensing and displaying of the pressure in the compressed air supply channel downstream of said regulating device, and
a mounting member having an exterior surface fixed to the apparatus juxtaposed to the regulating device,
the mounting member including a first air channel in communication with the air supply channel downstream of the device for regulation of the supply of compressed air and leading to a portion of the exterior surface of the mounting member, and a normally closed valve mounted in the first air channel at the portion of the exterior surface of the mounting member,
the pressure measuring device including a mating surface and a second air channel leading from the mating surface of the pressure measuring device to a pressure sensing element, the first and second air channels being axially off-line, and
the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being opened and the first and second air channels being placed in communication, and to enable manual demounting of the pressure measuring device from the mounting member to close the normally closed valve when the pressure measuring device is removed from the mounting member, whereby manual demounting of the pressure measuring device does not affect normal operation of the apparatus the mutually, the mutually coacting elements of the mounting member and the pressure measuring device constituting a dovetail joint.

31. The apparatus according to claim 20, wherein the pressure measuring device comprises a housing composed of a housing inner part that includes said mating surface and a compartment is located in said housing for holding a battery.

32. The apparatus according to claim 20, wherein the compartment has a blind recess in which a battery can be held.

33. An apparatus comprising:
a working part that utilizes compressed air,
a compressed air supply channel coupled to the working part to supply compressed air thereto,
a valve to control the supply of compressed air to the working part,
a regulating device located upstream of the valve for regulation of the supply of compressed air,
a pressure measuring device for the sensing and displaying of the pressure in the compressed air supply channel downstream of said regulating device, and
a mounting member having an exterior surface fixed to the apparatus juxtaposed to the regulating device,
the mounting member including a first air channel in communication with the air supply channel downstream of the device for regulation of the supply of compressed air and leading to a portion of the exterior surface of the mounting member, and a normally closed valve mounted in the first air channel at the portion of the exterior surface of the mounting member,
the pressure measuring device including a mating surface and a second air channel leading from the mating surface of the pressure measuring device to a pressure sensing element, the first and second air channels being axially off-line, and
the mounting member and the pressure measuring device having mutually coacting elements to enable manual mounting of the pressure measuring device onto the mounting member with the portion of the exterior surface of the mounting member and the mating surface of the pressure measuring device in engagement, the normally closed valve being opened and the first and second air channels being placed in communication, and to enable manual demounting of the pressure measuring device from the mounting member to close the normally closed valve when the pressure measuring device is removed from the mounting member, whereby manual demounting of the pressure measuring device does not affect normal operation of the apparatus the mutually,
the pressure measuring device including a housing composed of a housing inner part that includes said mating surface and a compartment being located in said housing for holding a battery, the compartment being slidably supported in the housing and a positioning element being provided for sliding said compartment out to expose a recess in which a battery can be positioned.

34. The apparatus according to claim 31, wherein the pressure measuring device includes a housing outer part that is removably mounted on the housing inner part.

35. The apparatus according to claim 31, wherein a removable pressure measuring unit is contained in the housing.

36. The apparatus according to claim 20, wherein the normally closed valve is comprised of a spring biased normally closed ball valve located at the portion of the exterior surface with the ball protruding slightly out of the exterior surface.

* * * * *